(12) United States Patent
Seeger et al.

(10) Patent No.: US 7,624,851 B2
(45) Date of Patent: Dec. 1, 2009

(54) FLUID-OPERABLE ROTARY DRIVE CLUTCH

(75) Inventors: Herbert Seeger, Bad Oeynhausen (DE); Udo Meller, Wermelskirchen (DE)

(73) Assignee: Ortlinghaus-Werke GmbH, Wermelskirchen (DE)

( * ) Notice: Subject to any disclaimer, the term of this patent is extended or adjusted under 35 U.S.C. 154(b) by 406 days.

(21) Appl. No.: 10/552,874

(22) PCT Filed: Feb. 14, 2005

(86) PCT No.: PCT/EP2005/001461

§ 371 (c)(1), (2), (4) Date: Oct. 25, 2006

(87) PCT Pub. No.: WO2005/078303

PCT Pub. Date: Aug. 25, 2005

(65) Prior Publication Data

US 2007/0102254 A1    May 10, 2007

(30) Foreign Application Priority Data

Feb. 12, 2004 (DE) .......... 10 2004 007 153

(51) Int. Cl.
*F16D 67/04* (2006.01)
*F16D 25/06* (2006.01)

(52) U.S. Cl. ............ 192/18 A; 192/70.12; 192/85 AA; 192/113.34

(58) Field of Classification Search ............ 192/85 AA, 192/84.6, 91 A; 60/545; 310/15, 20
See application file for complete search history.

(56) References Cited

U.S. PATENT DOCUMENTS

| | | | |
|---|---|---|---|
| 3,403,763 A | | 10/1968 | Hilpert et al. |
| 4,234,831 A | * | 11/1980 | Kemmer et al. ............ 318/115 |
| 4,344,022 A | * | 8/1982 | von der Heide ............ 318/38 |
| 4,664,242 A | | 5/1987 | Downs |
| 4,862,769 A | * | 9/1989 | Koga et al. ............... 475/86 |
| 4,947,974 A | * | 8/1990 | Smemo et al. ........... 192/85 AA |
| 5,224,906 A | * | 7/1993 | Sturm ..................... 475/86 |
| 5,325,949 A | * | 7/1994 | Dommett et al. ........ 192/70.252 |
| 5,440,183 A | * | 8/1995 | Denne ..................... 310/12 |
| 7,097,019 B2 | * | 8/2006 | Ronk et al. .............. 192/84.91 |

FOREIGN PATENT DOCUMENTS

FR    98 08002    6/1998

* cited by examiner

*Primary Examiner*—Rodney H Bonck
*Assistant Examiner*—Justin Holmes
(74) *Attorney, Agent, or Firm*—Pandiscio & Pandiscio

(57) ABSTRACT

The present invention concerns a rotary drive clutch that is fluid-operable by a piston/cylinder unit rigidly coupled to a clutch shaft and bearing-mounted so as to rotate therewith.

12 Claims, 3 Drawing Sheets

FLUID-OPERABLE ROTARY DRIVE CLUTCH

BACKGROUND OF THE INVENTION

1. Field of the Invention

The present invention concerns a fluid-operable rotary drive clutch.

2. Description of the Prior Art

A rotary drive clutch of this kind is used in machine construction to transmit the rotary movement of an input shaft to an output shaft as needed, the rotary drive clutch naturally being engaged or open, or being slippingly operated in the transitional range.

When the clutch is engaged, in order to transmit the required torque the drive plates concerned must be pressed together under high pressure via a piston/cylinder unit and an associated annular piston.

This function is performed by piston/cylinder units, from which operating fluid is delivered to the front face of the annular piston via a co-rotating pressure chamber. A basic problem with rotary drive clutches of this kind is the presence of sealing surfaces that rotate relative to one other, and that do so at the rotation speed of the input assembly at least when the clutch is engaged.

Hence, the only way to supply the pressure chamber in order to exert pressure on the drive plates is via a rotary leadthrough connected to a conduit system, one subconduit of which rotates at the shaft speed of the clutch and the other subconduit does not, and in which both subconduits are pressure-sealed against the pressure applied by the piston/cylinder unit.

A pressure-tight rotary leadthrough must therefore be provided between the output of the piston/cylinder unit and the conduit system communicating with the additional pressure chamber.

Particularly in the case of large machine installations, for example hydraulic presses used in the automotive industry, high pressures of up to about 100 bars must be sealed off via a leadthrough of this kind to prevent contamination of the environment.

Such a system is very onerous to design and build, however.

SUMMARY OF THE INVENTION

There is, therefore, a need for a fluid-operable rotary drive clutch in which the parts between the rotary drive clutch and the piston/cylinder unit that move in opposite directions as a result of their relative rotation do not require any elaborate hydraulic or pneumatic sealing measures.

It is consequently an object of the present invention to eliminate this disadvantage of the prior art and to specify measures that eliminate the need for elaborate rotary leadthroughs between the piston/cylinder unit and the rotary drive clutch.

The invention provides the advantage that the piston/cylinder unit, in combination with the clutch component that also carries the line connection communicating with the additional pressure chamber, forms a module whose components do not rotate relative to one another.

The piston/cylinder unit is therefore connected co-rotatingly for example to the clutch shaft, and can optionally be journaled in such a way that a rigid system can be assumed with respect to the need for pressure-tightness between the piston/cylinder unit and the clutch.

The piston/cylinder unit, together with the clutch shaft and generally the clutch component at which the delivery opening of the connecting line into the additional pressure chamber is disposed, can therefore be considered a static system in which the required pressure-tightness can be achieved by static measures alone.

These static measures can consist, for example, of pressure-tight flange connections between the clutch shaft and the piston/cylinder unit.

Thus, there is no further need for a leadthrough for the operating fluid.

The piston/cylinder unit is advantageously acted upon by an external force generator. The external force generator comprises a rotor that can be moved in the axial direction of the piston/cylinder unit and an assigned stator. The rotor is provided to be traversable in the axial direction of the piston/cylinder unit, and for purposes of pressure generation the pistons and cylinders are able to displace relative to one another, reducing the size of the fluid space.

Various embodiment examples can be conceived of for this purpose. In a first embodiment example, the rotor is journaled in a rotationally movable manner with respect to the stator. The rotor could then be connected to the piston/cylinder unit in a rotationally fixed manner.

A further embodiment example provides that the rotor and the stator are unable to rotate relative to each other.

For this case, it is proposed that the rotor be coupled to the rotary piston/cylinder unit via an axially acting pivot bearing.

This pivot bearing acting in the axial direction can be, for example, a sliding bearing or a roller bearing.

In a further embodiment example, the external force generator is a linear motor whose rotor is journaled not only axially traversably, but also rotatingly via the piston/cylinder unit.

Since, in linear motors of this kind, a contactless annular gap is provided between the rotor and the stator, this improvement of the invention also makes use of the free rotational movement of the rotor. Such linear motors are, for example, electrically or magnetoelectrically driven and belong to the prior art. Their particular advantage is their ability to be driven via a servo controller, for example in dependence on certain operating parameters.

It is not known, however, to use such magnetoelectric linear motors as co-rotating components in piston/cylinder units for actuating rotary drive.

The considerable pressures, ranging up to approximately 100 bars or more, that can occur in such rotary drive can be reduced in an especially simple manner if the piston/cylinder unit is mounted in a pair of oppositely disposed angular ball bearings.

The mutual positioning of the angular ball bearings, preferably at the outer circumference of the piston/cylinder unit, permits compact construction and, in particular, makes it easier to use standardized components.

The possibility of easily integrating the invention into a so-called clutch/brake combination is of particular advantage.

In such a clutch/brake combination, the annular piston serves both as the clutch actuating ring and as the brake actuating element. Which function is performed depends on the direction of displacement at any given time, although the piston/cylinder unit must be able to rotate only in combination with the rotary drive clutch.

In terms of the braking function, as along as there is no problem of rotary movement, there is no problem of a fluid-tight rotary leadthrough.

Of course, if the brakes are also acted on via a rotary-mounted ring, then all of the above statements apply accordingly.

However, an embodiment is preferred in which the force is applied to the displacing element of the brake by elastically biased springs, which are tensioned against increasing elastic force as pressure is exerted to actuate the clutch.

A clutch/brake combination of this kind operates in two precisely defined end positions: a braking position, in which the clutch is disengaged and the brake is engaged, and a clutch engagement position, in which only the clutch is engaged and the brake is idle.

To reduce wear and tear on the clutch linings, it can additionally be provided to feed cooling oil to the clutch chamber through an also co-rotating conduit system.

Embodiment examples are specified for this purpose.

BRIEF DESCRIPTION OF THE DRAWINGS

The invention is described more thoroughly hereinbelow with reference to embodiment examples. In the drawing.

DESCRIPTION OF THE PREFERRED EMBODIMENTS

Figure 1:
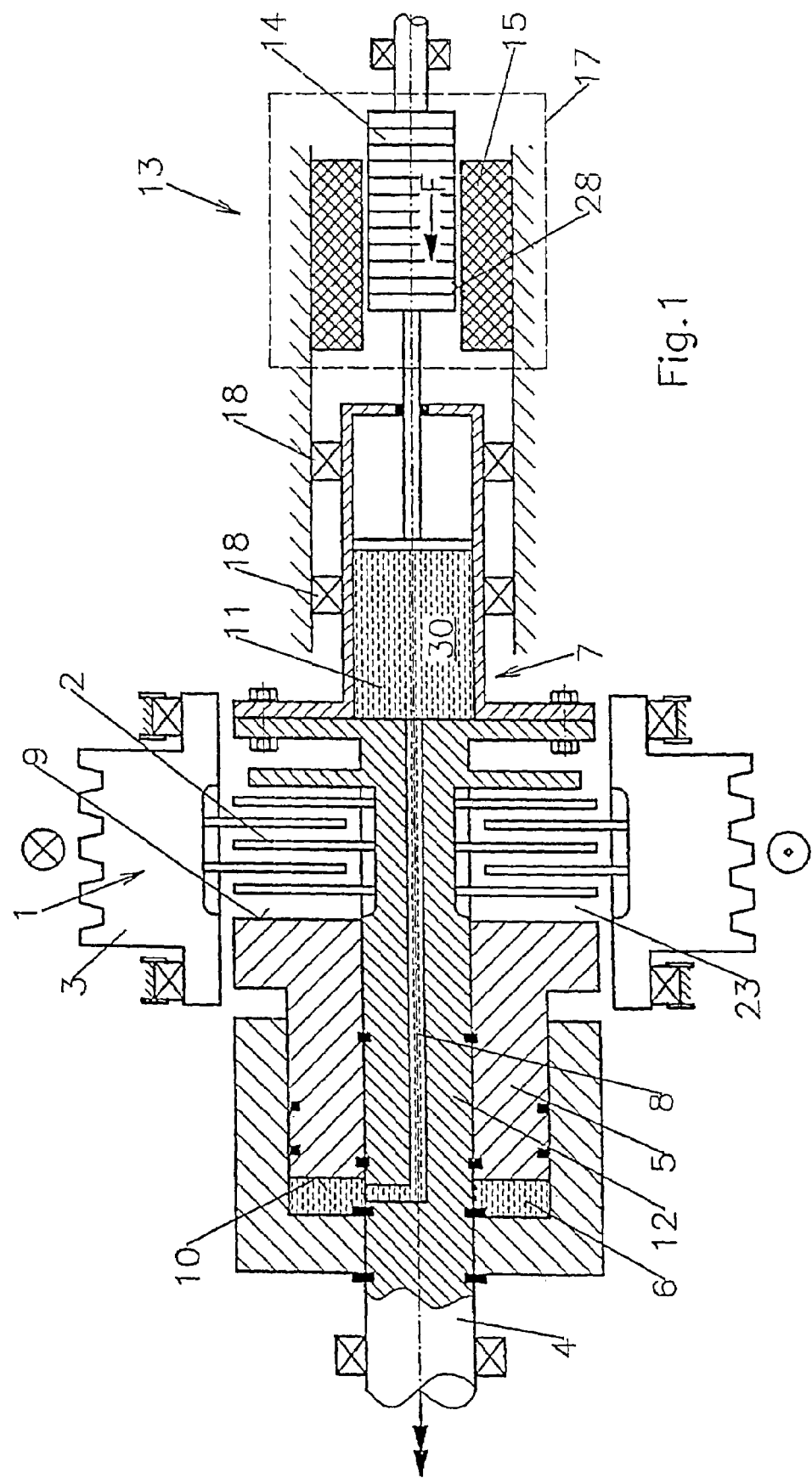
FIG. 1 shows a first embodiment example of the invention.

Unless otherwise stated below, the following description applies throughout to all the figures.

The figures depict a rotary drive clutch 1.

Said rotary drive clutch 1 comprises drive plates 2. The drive plates 2 are connected in a rotationally fixed manner to the input assembly 3 and in a rotationally fixed manner to the output assembly 4.

The drive plates 2 are seated, in a minimally axially translatable manner, respectively either on the central clutch shaft 12 or on the component of the clutch facing away from the clutch shaft.

For the present considerations, it makes no difference in principle whether clutch shaft 12 is considered to be the input assembly or the output assembly.

Depending on the foregoing choice, the indicated pulley at whose periphery the force vectors are applied then serves as the output or input assembly 4 or 3, respectively.

For all individual components of the rotary drive clutch that are individually named but not depicted, see the prior art.

It is essential that the frictional forces that are to be transmitted to the clutch be applied by an annular piston 5. Here, annular piston 5 is seated on clutch shaft 12 and is axially translatable.

At its end facing away from the drive plate 2, annular piston 5 has a front face that is impinged on by an operating fluid.

Said operating fluid 11 can be a hydraulic or pneumatic medium.

Said impingement on the front face of annular piston 5 takes place from the pressure chamber 30 of piston/cylinder unit 7, which is connected via a connecting line 8 to an additional pressure chamber 6, said connecting line 8 opening into additional pressure chamber 6 via a corresponding opening.

This additional pressure chamber 6 is sealed by the front face of annular piston 5. Whereas annular piston 5 is seated translatably on clutch shaft 12 and is also sealed via the seals not denoted in greater detail, it is surrounded at its outer periphery by a piston housing that forms the additional enclosing walls of pressure chamber 6.

When pressure is applied to additional pressure chamber 6 by operating fluid 11, clutch actuating ring 9 is acted upon such that it is translated axially in the direction of rotary drive clutch 1. This causes drive plates 2 to come into positive and frictionally locking contact so that the required torques are transmitted.

The embodiment examples show a rotary drive clutch in which the clutch actuating ring, when subjected to pressure, engages the clutch.

However, it is also possible to conceive of a rotary drive clutch that is engaged for example by spring biasing, while the operating fluid, via a suitably arranged additional pressure chamber, causes said rotary drive clutch to disengage.

In this case, the front face of the piston, facing the pressure chamber, would have to point in the direction of the rotary drive clutch 1, while at the opposite end, annular piston 5, subjected to elastic force, is displaced into the engaged position of the rotary drive clutch.

It is essential in this case that the operating fluid be conducted via piston/cylinder unit 7 through an axial bore, here provided in clutch shaft 12, into co-rotating additional pressure chamber 6.

To this end, the discharge opening of connecting line 8 is constantly connected to additional pressure chamber 6, while the other end of connecting line 8 is disposed at the outlet of piston/cylinder unit 7.

So that a pressure-tight connection with no rotary leadthroughs exists between the clutch component from which connecting line 8 opens into additional pressure chamber 6—i.e., in the present case clutch shaft 12—and piston/cylinder unit 7, piston/cylinder unit 7 is connected to clutch shaft 12 in a rotationally fixed, pressure-resistant and co-rotatable manner.

This means, however, that piston/cylinder unit 7 rotates with clutch shaft 12 as soon as the clutch is in the slipping state or the disengaged state.

The tight connection between piston/cylinder unit 7 and clutch shaft 12 can therefore consist of an easily made flange connection, sealed with O-ring seals if appropriate.

The figures further illustrate different ways of acting on the piston/cylinder unit.

An external force generator 13 is, however, provided in all cases. The external force generator 13 comprises a rotor 14 able to move in the axial direction of piston/cylinder unit 7 and an assigned stator 15. Between the stator and the rotor, according to the principle of action and reaction a force is transmitted to the piston/cylinder unit 7 that ultimately causes a relative displacement of the piston and the cylinder, so that the pressure chamber of piston/cylinder unit 7, when a force is applied, is correspondingly reduced in size to actuate rotary drive clutch 1.

Figure 2:
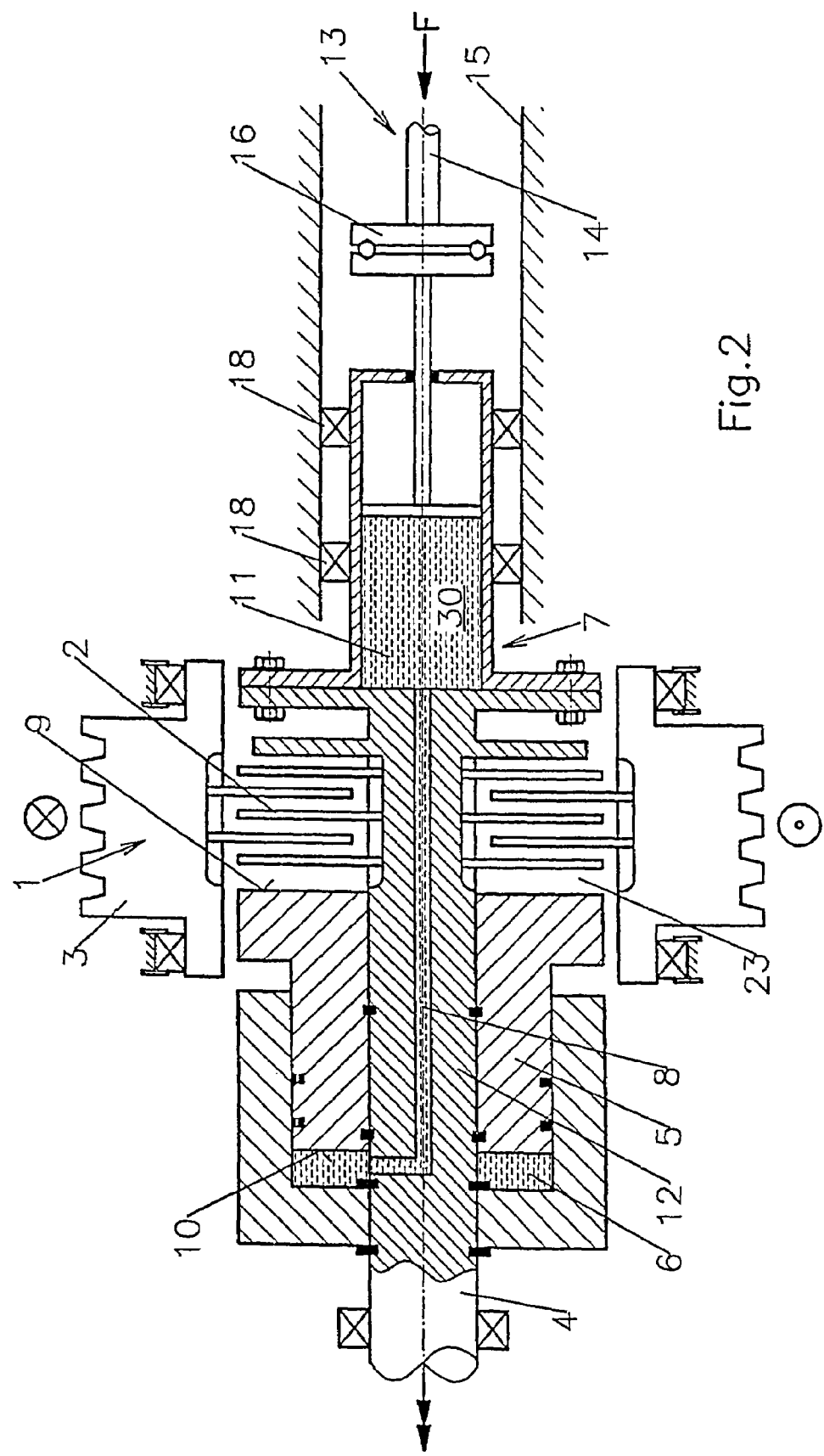
FIG. 2 shows an additional embodiment example of the invention.
Figure 3:
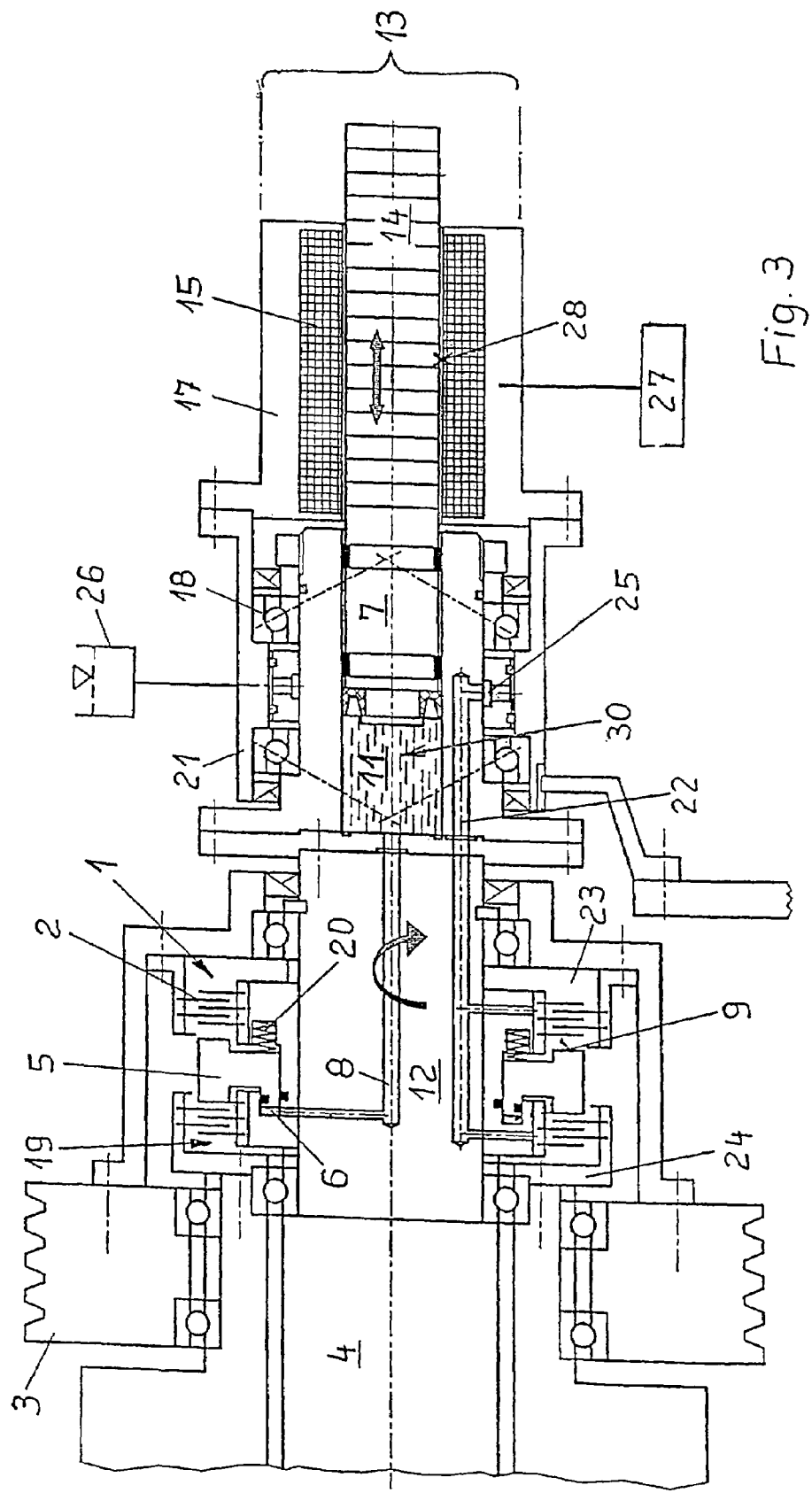
FIG. 3 shows an embodiment example of the invention in a clutch/brake combination.

FIGS. 1, 3 and 2 additionally disclose different principles.

In the case of FIGS. 1 and 3, external force generator 13 comprises a rotor 14 that is rotationally movably mounted opposite the stator 15.

Rotor 14 is additionally traversable in the axial direction of piston/cylinder unit 7. FIG. 2, by contrast, shows an improvement in which piston/cylinder unit 7 is acted on by the rotor 14 of an external force generator 13, which rotor 14, although traversable in the axial direction of piston/cylinder unit 7, is not seated in a rotary bearing.

To this end, provided between rotor 14 and piston/cylinder unit 7 is an axial-force pivot bearing 16 that eliminates the relative movement between the rotary piston/cylinder unit 7 and external force generator 13.

This can be a sliding bearing or, preferably, a roller bearing.

The figures additionally show an external force generator 13 in the form of a linear motor 17.

This arrangement is a direct drive, in which the linear motion is generated in a wear-free manner without the interposition of mechanical gearing. The unique feature is that the linear motor is composed of only two parts: the rotor 14 and the stator 15.

Furthermore, in addition to the motor windings, any necessary bearings for the rotor, for the position detector and for any microprocessor circuit that may be present can be accommodated in the housing of the linear motor, which is stationarily disposed.

The advantage of a linear motor with an electrically or magnetoelectrically driven rotor is absolute freedom from wear.

Between the rotor 14 and the stator 15 is an annular air gap 28 that must, of course, be provided in order to prevent short circuits.

The embodiment of FIGS. 1 and 3 makes use of this annular air gap, which ensures that the rotor 14 is able to rotate freely in the stator 15 in any axial position.

As a complement hereto, FIG. 3 shows an improvement in which the linear motor 17 is driven via a servo controller 27.

Servo controller 27 can, moreover, be a component of a closed control circuit in which predefined operating parameters or predefined time functions for pressure buildup, etc., are controlled.

In the present case, servo controller 27 is driven via a pressure sensor disposed in additional pressure chamber 6, in order to displace clutch actuating ring 9 according to a preset time function.

It is understood that any other useful operating parameters can be used as input variables for the servo controller, for example the temperature of the friction linings, the play of the clutch, the wear of the clutch, etc.

In addition, FIG. 3 shows that piston/cylinder unit 7 is mounted axially immovably on a pair of oppositely disposed angular ball bearings 18.

The advantage of this improvement is that even in the event of high pressures of up to 100 bars or more, all of the axial forces acting on piston/cylinder unit 7 are removed by the stationary housing.

Furthermore, FIG. 3 shows an embodiment example in which clutch actuating ring 9 is also acted on translatably in its axial direction of movement opposite the action of the pressure by a counteracting force generator 20. In this case, the counteracting force generator 20 is formed by spring coils that act on the clutch side of clutch actuating ring 19 and endeavor to displace it in the direction of additional pressure chamber 6.

These elastically biased springs are therefore tensioned against increasing resilient force as the pressure applied by annular piston 5 increases during the operation of the clutch.

Obviously, as the volume of the piston/cylinder unit is increased by the displacement of the piston in the direction of external force generator 13, the operating fluid 11 exits additional pressure chamber 6 to the extent dictated by the displacement of piston/cylinder unit 7.

Clutch actuating ring 9 is thereby displaced on the clutch shaft in the direction of a brake 19 disposed opposite rotary drive clutch 1, so that after rotary drive clutch 1 is disengaged, the still-rotating clutch shaft 12 subsequently comes to a stop.

The present invention therefore is not limited to the use of rotary drive clutch 1 alone, but also lends itself to use in connection with brakes.

One can also contemplate actuating the brake, not with spring coils, but by means of a fluid-operated—i.e., pneumatically or hydraulically operated—counteracting force generator, which according to the present invention is also connected co-rotatingly to the clutch shaft 12.

Thus far, the foregoing description applies.

If, as illustrated in particular by FIG. 3, the piston/cylinder unit 7 is journaled rotatably in a stationary and self-contained housing 21, additional communicating conduits can be provided that are connected communicatingly in the form of a co-rotating conduit system 22 to the clutch chamber and/or to the brake chamber 24, if present.

It is essential in this case that the sealed chamber between closed housing 21 and piston/cylinder unit 7 be connected to co-rotating conduit system 22.

This can be effected, for example, by means of an annular feed line 25, which is connected to the sealed chamber between stationary housing 21 and piston/cylinder unit 7, regardless of the rotational position of piston/cylinder unit 7.

One option in particular in this case is to connect this co-rotating conduit system 22 via annular feed line 25 to a non-co-rotating cooling oil tank 26 in order to better dissipate the heat generated during the braking or clutching process and to reduce or minimize lining wear.

LIST OF REFERENCE NUMERALS

1 Rotary drive clutch
2 Drive plate
3 Input assembly
4 Output assembly
5 Annular piston
6 Additional pressure chamber
7 Piston/cylinder unit
8 Connecting line
9 Clutch actuating ring
10 Front face of piston, facing the additional pressure chamber
11 Operating fluid
12 Clutch shaft
13 External force generator
14 Rotor
15 Stator
16 Axial-force rotating bearing
17 Linear motor
18 Angular ball bearing
19 Brake
20 Counteracting force generator
21 Stationary housing
22 Co-rotating conduit system
23 Clutch chamber
24 Brake chamber
25 Annular feed line
26 Cooling oil tank
27 Servo controller
28 Air gap
30 Pressure chamber of piston/cylinder unit

What is claimed is:

1. A fluid-operable rotary drive clutch (1), comprising drive plates (2), at least one of which is connected rotationally fixedly to an input assembly (3) and at least one other is connected rotationally fixedly to an output assembly (4), operating fluid (11) being conveyed from a first pressure chamber of a piston/cylinder unit (7) through an axial bore defined by a connecting line (8) provided in a clutch shaft (12) to a second pressure chamber (6), which is sealed by an annular piston (5) of a clutch actuating ring (9) that is axially translatable when pressure is applied to it, a front face of the piston/cylinder unit, facing toward the second pressure chamber (6), being acted on by the pressure of the operating fluid (11) to engage or disengage the rotary drive clutch (1), depending on the function of the rotary drive clutch (1), and the piston/cylinder unit (7) being connected to the axial bore of the connecting line (8) provided in the clutch shaft (12) rotationally fixedly, pressure-tightly, and co-rotatably with the clutch shaft (12) from which the axial bore of connecting line (8) which is provided in the clutch shaft (12) opens into the second pressure chamber (6), wherein the piston/cylinder unit (7) is acted on by an external force generator (13) comprising a rotor (14) and a stator (15), said rotor (14) being traversable in an axial direction of the piston/cylinder unit (7) and being journaled so that it is able to move rotationally with respect to said stator (15), and coupled to the rotatable piston/cylinder unit (7) by an axial-force rotating bearing (16).

2. The rotary drive clutch in accordance with claim 1, wherein the axial-force rotating bearing (16) comprises a sliding bearing.

3. The rotary drive clutch in accordance with claim 1, wherein the axial-force rotating bearing (16) comprises a roller bearing.

4. The rotary drive clutch in accordance with claim 1, wherein the external force generator (13) comprises a linear motor (17).

5. The rotary drive clutch in accordance with claim 4, wherein said rotor (14) of said linear motor (17) is electrically or magnetoelectrically driven.

6. The rotary drive clutch in accordance with claim 4, wherein said linear motor (17) is drivable by a servo controller (27).

7. The rotary drive clutch in accordance with claim 4, wherein said linear motor (17) is operated in a closed control circuit with preset operating parameters.

8. The rotary drive clutch in accordance with claim 1, wherein the piston/cylinder unit (7) is supported axially and immovably by a pair of oppositely disposed angular ball bearings (18).

9. The rotary drive clutch in accordance with claim 1, wherein the clutch actuating ring (9) is translatable, in its axial direction of movement, opposite the direction of application of pressure, by a counteracting-force generator (20), and serves as a displacing element of a brake (19).

10. The rotary drive clutch in accordance with claim 9, wherein the counteracting-force generator (20) is elastically biased and comprises springs arranged such that they are tensioned against increasing resilient force as pressure applied by the annular piston (5) to actuate the clutch increases.

11. The rotary drive clutch in accordance with claim 1, wherein the piston/cylinder unit (7) is mounted rotatably in a stationary and self-contained housing (21) and is connected communicatingly, by a co-rotating conduit system (22), to a selected one of a clutch chamber and a brake chamber (24).

12. The rotary drive clutch in accordance with claim 11, wherein the co-rotating conduit system (22) is connected by an annular feed line (25) to a non-co-rotating cooling oil tank (26).

\* \* \* \* \*